United States Patent
Steinkönig

[19]

[11] Patent Number: 5,615,457
[45] Date of Patent: Apr. 1, 1997

[54] SPRING BAND CLAMP

[76] Inventor: Uwe Steinkönig, Augustiner Strasse 31, 55116 Mainz, Germany

[21] Appl. No.: 500,737

[22] Filed: Jul. 11, 1995

[30] Foreign Application Priority Data

Jul. 11, 1994 [DE] Germany ............... 44 24 046.5

[51] Int. Cl.$^6$ ................................. B65D 63/00
[52] U.S. Cl. ............... 24/20 R; 24/20 EE; 24/20 TT
[58] Field of Search ............... 24/20 R, 20 CW, 24/20 EE, 20 TT, 20 W, 22, 23 R, 23 EE, 20 S, 24

[56] References Cited

U.S. PATENT DOCUMENTS

| | | | |
|---|---|---|---|
| 1,776,783 | 9/1930 | Cornell, Jr. | 24/23 EE |
| 4,882,814 | 11/1989 | Takahashi | 24/20 R |
| 4,951,363 | 8/1990 | Takahashi et al. | 24/20 R |
| 5,157,815 | 10/1992 | Dyer | 24/20 TT |

FOREIGN PATENT DOCUMENTS

| | | |
|---|---|---|
| 2602572 | 2/1988 | France . |
| 8700695 | 7/1987 | Germany . |
| 3633486 | 5/1988 | Germany . |
| 9212200 | 12/1992 | Germany . |
| 4312846 | 4/1994 | Germany . |

*Primary Examiner*—Victor N. Sakran
*Attorney, Agent, or Firm*—Sixbey, Friedman, Leedom & Ferguson, P.C.; David S. Safran

[57] ABSTRACT

A spring band clamp with a spring band (2), a pair of tensioning endpieces which project from the spring band (2), and a holding element (5) which holds the tensioning endpieces (3,4) in a spread, installation state of the spring band clamp (1) under a pretensioning force. The holding element (5) has a holding section (6) and a disengagement section. To enable installation of the spring band clamp (1) in an engine compartment of a motor vehicle under conditions of restricted space in an especially simple manner and without special tools, the disengagement section (7) of the holding element (5) has a finger grip section (8) for enabling the holding element (5) to be disengaged from the tensioning endpieces of the spring band by direct engagement of the finger grip portion with at least one finger and for thereby enabling the spring band clamp to spring into an essentially released, clamping state.

15 Claims, 3 Drawing Sheets

SPRING BAND CLAMP

BACKGROUND OF THE INVENTION

1. Field of the Invention

The invention relates to a spring band clamp with a spring band having a pair of tensioning ends projecting therefrom, and a holding element which fixes the tensioning ends in a spread, installation state of the spring band clamp, the holding element having a holding section and a withdrawal section. After withdrawal or detachment of the holding element, the spring band clamp springs into an essentially released, clamping state.

2. Description of Related Art

A spring band clamp of the aforementioned type which is pretensioned open has been known for years in the prior art. In an automobile, spring band clamps which are pretensioned open create reliable connections between a hose and connection piece. In contrast to rigid screw clamp connections, the elastic reset moments of the spring band always ensure the necessary surface pressure for leak-proof connection when the diameter of the hose changes due to temperature fluctuations and the tendency of rubber to creep. System pressures of 2 bar are reliably managed even at temperatures of minus 40° C. with these spring band clamps.

For initial installation, the spring band clamps which are pretensioned open are generally fixed in a position which is suitable for installation using a holding element. Since the spring band clamp which is pretensioned open is spread in the installation state, it can be easily moved over the hose end which sits on a connecting branch as far as the respective set or installation site. Before the spring band clamp can spring back into its essentially untensioned, clamp state for securing the hose, the holding element which fixes the tension ends in a spread position of the spring band clamp must be removed, that is, pulled off or detached from the tension ends. Pulling off in the past was done with special pliers or with special tools as are described, for example, in German Utility Model No. 92 12 200 or German Patent No. 43 12 846.

The aforementioned pliers or special tools have proven effective in practice. In any case, it can occur especially on poorly accessible points in the engine compartment, that withdrawal of the holding element at these points using the aforementioned pliers or special tools is possible only with difficulty, if at all.

SUMMARY OF THE INVENTION

In view of the foregoing, it is a primary object of the present invention to enable manual releasing of the holding part without the aid of pliers or special tools.

This object is achieved in accordance with preferred embodiments of the invention by providing the withdrawal section of the holding element of a spring band clamp of the type mentioned initially with a grip section for manually pulling off or detaching the holding element, this grip section being formed for actuation by at least one finger.

First of all, the invention is based, on the one hand, on the finding that with an appropriate design of the withdrawal section, specially by devising a grip section for one finger, it is quite possible to pull off the holding element directly by hand. In the past, it was assumed in the prior art that this was possible only using the aforementioned pliers or special tools. The invention now offers the major advantage that special tools for pulling off the holding element are no longer necessary, and the costs which are incurred for this purpose can therefore be saved. Furthermore, in the spring band clamp according to the invention, the installation time, installation itself, and handling are greatly improved. Finally, this turns out be especially economical.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
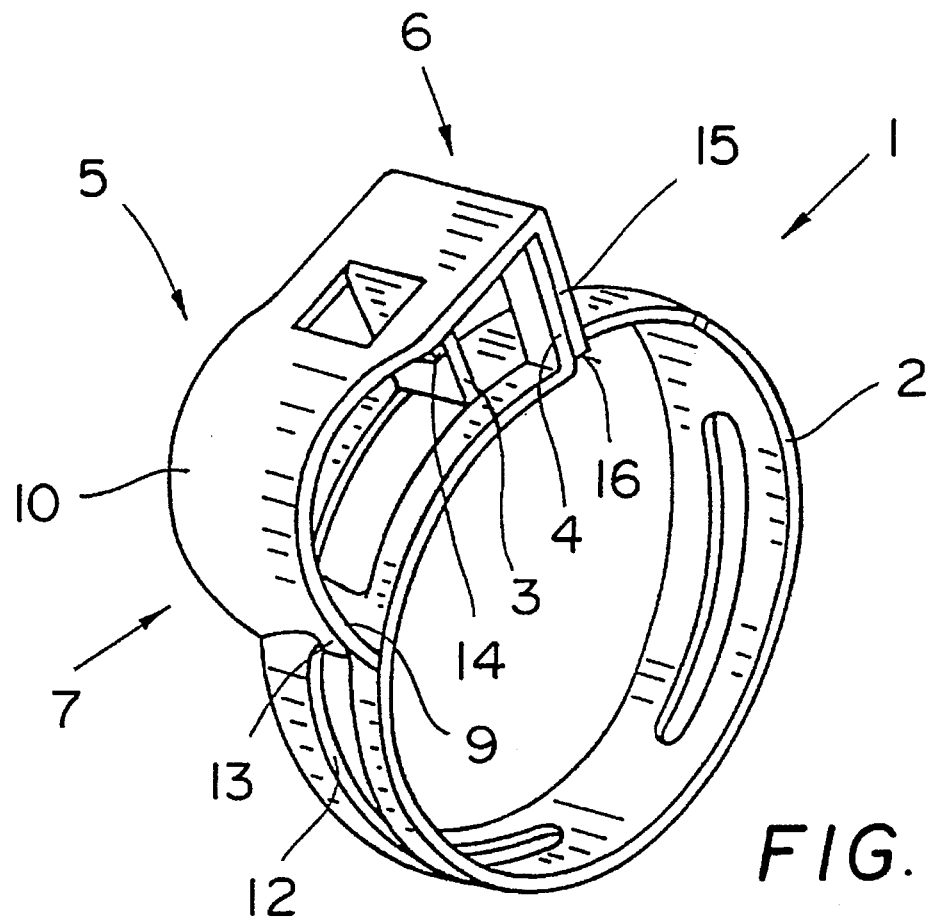
FIG. 1 shows a perspective view of a first embodiment of a spring band clamp according to the invention in an installation state.
Figure 2:
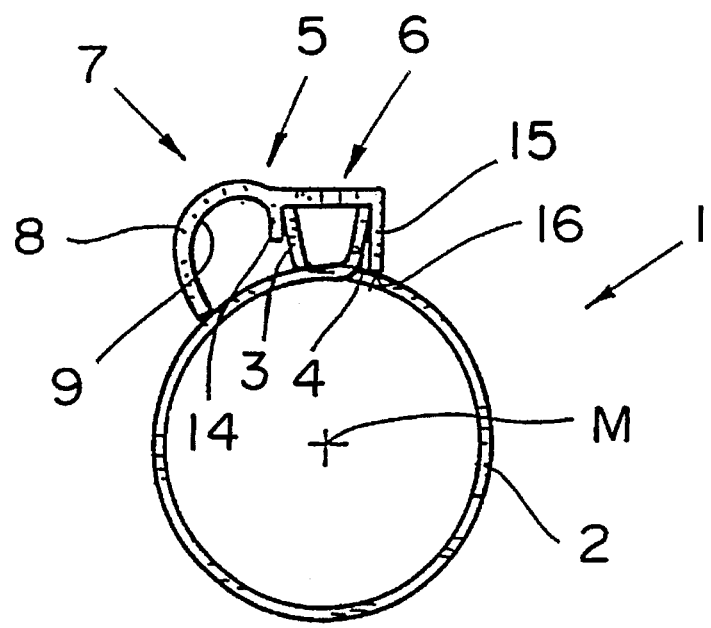
FIG. 2 shows a side view of the spring band clamp of FIG. 1.

FIGS. 1 and 2, on the one hand, and 4 through 6 on the other, show different embodiments of a spring band clamp 1 according to the invention. In the following, all comments apply to both of these two embodiments except where reference is made to specific differences.

Spring band clamp 1 has spring band 2 which has on a tensioning endpiece 3, 4 projecting from each end of the spring band 2. Tensioning endpieces 3, 4 extend roughly radially with respect to central axis M of the spring band clamp 1. Except for spring band clamp 1 shown in FIG. 6, all other spring band clamps 1 shown are in a spread state which is hereafter called the installation state. In the installation state, the tensioning ends 3, 4 are fixed by a holding element 5. Holding element 5, in turn, has a holding section 6 and a disengagement section 7. Holding section 6, here, is used to hold together or fix the tensioning ends 3, 4 in the installation state, while disengagement section 7 is used for application of a disengaging force for disengagement of the holding element 5 from at least one of the tensioning ends 3, 4. The released state, which is hereafter called the clamping state, is achieved after disengagement of the holding element 5, releasing the tension ends 3, 4 to move apart, so that the spring band clamp 1 can spring into its clamp state.

For both embodiments, it is important that the disengagement section 7 of the holding element 5 has a grip section 8 for manually disengaging the holding element 5. The grip section 8 is shaped for facilitating actuation thereof by means of at least one finger. By the correspondingly ergonomic design of grip section 8, it is therefore possible to manually pull the holding element 5 off without the need for special manipulation tools. In this way, spring band clamp 1 can also be easily clamped or released even when situated at points which are poorly accessible with a manipulation tool by pulling off or detaching the holding element 5.

It is especially feasible if grip section 8, in the installation state of spring band clamp 1, is arranged off center with respect to the tensioning endpiece or endpieces 3, 4 to be disengaged. In this way, when holding element 5 is pulled off or detached from the tensioning endpiece(s) 3, 4, a lever action occurs, so that the required withdrawal forces are reduced. In the embodiments shown, the grip section 8 is located adjacent to tensioning endpieces 3, 4 and is formed as a finger loop under which a finger can be engaged. By this arrangement of the grip section adjacent to the tensioning endpieces, the effective lever arm for pulling off or detaching the holding element 5 is further increased, so that the required disengagement forces are still further reduced. Grip section 8, in this case, extends preferably tangentially and\or in an arc with respect to the spring band 2. It goes without saying that the grip section 8 can also extend in a radial direction and can have, for example, a loop shape. In such an embodiment, the spring band clamp 1, including the holding element 5, however, occupies a relatively large amount of space in a radial direction. In order for the finger load to be low when the holding element 5 is disengaged from the tensioning ends 3, 4 for releasing spring band clamp 1, it is furthermore provided that the grip section 8 has an arch 9 matched to the shape of a finger. The force distribution is good over the entire arch 9 during disengagement.

Grip section 8, however, has an arch 9 not only over part of its length, but also another arch 10 which extends over its width and which is arched to the inside, by which even better force distribution and lower finger load result during disengagement. Grip section 8, itself, therefore is ergonomically formed with respect to manual finger withdrawal, the width of grip section 8 being several times greater than its thickness, and with both a lengthwise and widthwise curvature. In the embodiments shown, the width of grip section 8 roughly corresponds to the width of spring band 2.

Figure 3:
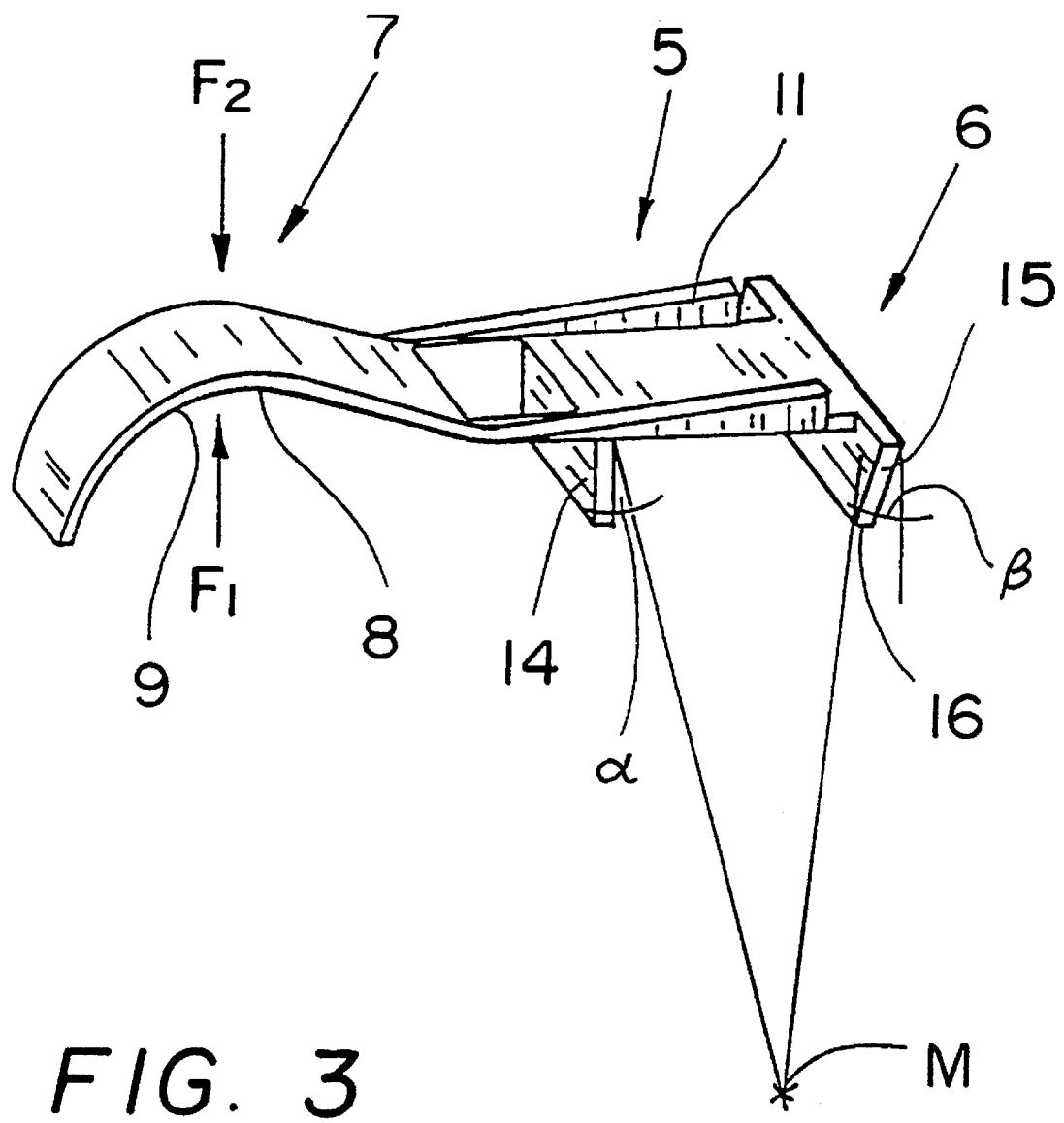
FIG. 3 shows a side view of a holding element of the spring band clamp shown in FIG. 1.

At least on one side, preferably on both outer sides, the grip section 8 has a fold 11 (which is shown only in FIG. 3), so that its stiffness is higher and there is no danger that grip section 8 will bend during disengagement. Instead of grip section 8 being provided with the aforementioned fold(s) 11, of course, it can also be subjected to a hardening treatment; however, this is more complex in terms of process engineering. In order to not adversely affect the ergonomy of grip section 8 in the area of arch 9, it is sufficient to restrict the fold to the transition area of holding section 6 leading up to grip section 8, since this site is the critical point at which bending ordinarily takes place.

In transport and/or installation of spring band clamp 1, disruptive forces can occur which can lead to unintentional detachment of the holding section 6, releasing the clamp from its installation state. To ensure that disruptive forces acting in the direction of the central axis M do not lead to unintentional detachment, grip section 8 is designed to interact with the spring band 2 such that the grip section 8 is fixed against lateral movement, therefore, in the direction of central axis M. In the embodiment of FIGS. 1 and 2, for lateral fixing, at least one opening 12 is provided in spring band 2 and a projection 13 is provided on the grip section 8 which fits into the opening 12 when the clamp is in its installation state. Opening 12 is, therefore, used (among others) for executing a form fit between spring band 2 and grip section 8 in the direction of central axis M.

Figure 4:
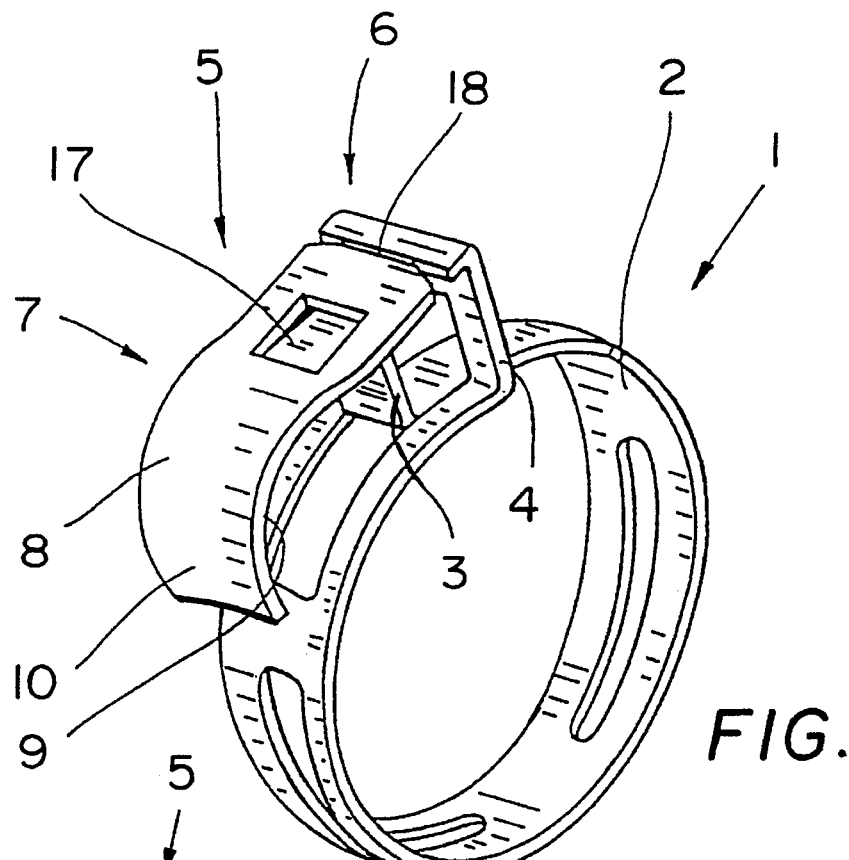
FIG. 4 shows a perspective view of a second embodiment of the spring band clamp according to the invention in the installation state.
Figure 4A:
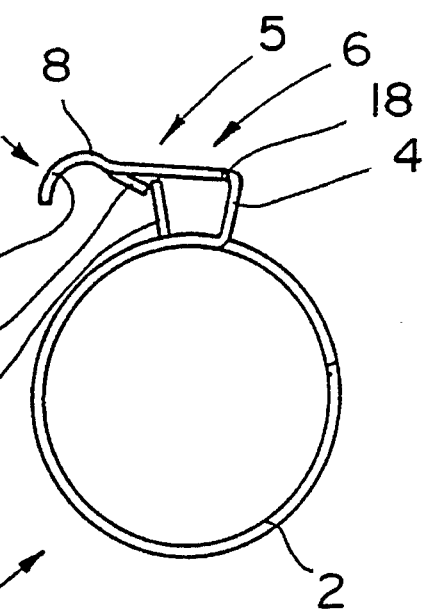
Figures 5, 6:
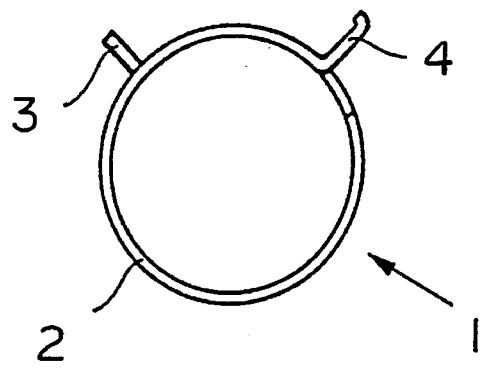
FIG. 5 shows a side view of the spring band clamp of FIG. 4.
FIG. 6 shows a side view of the spring band clamp of FIG. 4 in the clamping state with the holding element removed.

Although, in the embodiment shown in FIGS. 4–6, lateral fixing between grip section 8 and spring band 2 in the direction of central axis M is not shown, it goes without saying that the aforementioned type of fixing can be accomplished in this embodiment as well.

In the embodiment shown in FIGS. 1 and 2, to which reference is made in the following, holding element 5 is formed as a separate part. Design of holding element 5 as a separate part enables re-use when the holding element is returned to the manufacturer after it is pulled off. In this embodiment, holding section 6 of holding element 5 is made as a roughly U-shaped clamp for reaching over and fixing tension ends 3,4 in the installation state. The clamp has a first fixing arm 14 near grip section 8 and a second fixing arm 15 away from grip section 8. First fixing arm 14 is a bent clip punched out of the material of holding element 5. Based on the U-shaped clamp, in any case, secure fixing of tension ends 3, 4 is possible in the installation state. Second fixing arm 15 sits with its lower edge 16 on spring band 2. In this way, there is, on the one hand, a set fulcrum for pulling off (by a lever action swinging) of holding element 5, and on the other, a relatively large lever arm.

The arrangement of first fixing arm 14 relative to the roughly radially running tensioning endpiece 3, optimization is necessary with respect to the required withdrawal force, on the one hand, and a disruptive force $F_1$ (FIG. 3) acting in the same direction as the disengagement force. Basically, first fixing arm 14 should be arranged such that the withdrawal force is minimized; however, this force should not be so small that the aforementioned disruptive force $F_1$ acting in the same direction releases spring band clamp 1. With the aforementioned stipulation, it is easy for one skilled in the art to optimize the corresponding arrangement or angular position of first fixing arm 14 relative to tensioning endpiece 3. In this regard, angle $\alpha$ shown in FIG. 3 should be as small as possible, but with respect to the aforementioned, it should not be too small. The angle $\alpha$ is between the radius of spring band clamp 1 and first fixing arm 14.

The same applies to the arrangement and design of second fixing arm 15. Here angle $\beta$ between the inside of second fixing arm 15 and the outside of corresponding tensioning endpiece 4, measured from lower edge 6 of the second fixing arm 15, should be selected to be comparatively large, if possible, in order that its lower edge 16 can rest can lie flat in a line on tensioning endpiece 4. In this way, high surface pressure is achieved. The high surface pressure serves to prevent a possible disruptive force $F_2$ acting from above on grip section 8 from leading to unintentional B releasing of spring band clamp 1. At the same time, however, the distance between the two fixing arms 14, 15 should be as small as possible, so that when the grip section 8 is pressed down strongly, as the result of the short distance (small lever path), an unintentional release does not occur. The danger that disruptive force $F_2$, acting from above on grip section 8, will lead to releasing of the spring band clamp 1 is, however, especially low when, as shown in FIGS. 1 and 2, the free end of grip section 8 lies on spring band 2.

In the embodiment shown in FIGS. 4 through 6, holding element 5 is made integral (of one piece) with spring band clamp 1. Not only is production easy, but prefabrication is also simple due to this integral arrangement. In this case, holding element 5 is connected to tensioning endpiece 4 and is bent away from it in the direction to other tensioning endpiece 3. Furthermore, holding element 5 has a bent clip 17 for engaging behind the tensioning endpiece 3. Clip 17 is punched out of the material of holding element 5 and is bent in a direction toward spring band 2. In this case, clip 17 is bent with only a small angle relative to spring band 2; this facilitates tensioning of spring band clamp 1. The end of grip section 8 facing the tensioning endpiece 4 has a predetermined breaking point/fine 18 which is preferably made as a notch or groove extending over the entire width of grip section 8. Predetermined breaking point 18 is indented on its ends. Here as well, optimization is necessary to ensure that grip section 8 disengages when the tensioning endpiece 4 is pulled off. In this embodiment, tensioning endpiece 4 is roughly U-shaped, the grip section 8 adjoining the top end of the tensioning endpiece 4. The other tensioning endpiece 3 extends through a slot-shaped opening created by the U-shape of the tensioning endpiece 4.

The spring band clamp 1 embodiment as shown in FIGS. 1 and 2, is tensioned from its released state using a tool which draws the tensioning endpieces 3, 4 towards one another. Holding element 5 is then set on the tensioning endpieces 3, 4 once they are located relatively close to one another and so that the projection 13 fits into opening 12. After holding element 5 is in place, the spring band clamp 1 is in its installation state.

In the embodiment shown in FIGS. 4 through 6, tension endpieces 3, 4 are, likewise, moved towards one another during tensioning. Tensioning endpiece 3, in this case, runs along the sloped underside of clip 17 until its free edge engages behind free end of clip 17. Spring band clamp 1 is then, likewise, in the installation state.

In the embodiment mentioned first, withdrawal takes place by using one finger to reach under grip section 8 and engage it in the area of arch 9. When sufficient force is applied to the holding element 5, it then pivots around lower edge 16, which serves as a fulcrum, until first fixing arm 14 disengages from tensioning endpiece 3. Then, spring band clamp 1 springs into the clamping state. The same applies to the second embodiment, holding element 5 pivoting, instead, around the predetermined breaking point 18. If, in doing so, the tensioning endpiece 3 separates from clip 17, spring band clamp 1, likewise, springs into the clamp state. Predetermined breaking point 18 is designed such that it breaks away from second fixing arm 15, either immediately after disengaging from the tensioning endpiece 3 or upon further pivoting movement of the gripping section 8 of holding element 5. However, while preferred, breaking away is not essential and if the groove merely function to create a hinge point, such will be sufficient.

While various embodiments in accordance with the present invention have been shown and described, it is understood that the invention is not limited thereto, and is susceptible to numerous changes and modifications as known to those skilled in the art. Therefore, this invention is .not limited to the details shown and described herein, and includes all such changes and modifications as are encompassed by the scope of the appended claims.

We claim:

1. A spring band clamp with a spring band having a pair of tensioning endpieces projecting therefrom, and a holding element which holds the tensioning endpieces in a position placing the spring band clamp in a spread, installation state in which the spring band is subjected to a pretensioning force; wherein the holding element has a holding section and a disengagement section; wherein the disengagement section of the holding element has a finger grip portion serving as a means for enabling the holding element to be disengaged from said at least one of the tensioning endpieces of the spring band by direct engagement of the finger grip portion with at least one finger and for thereby enabling the spring band clamp to spring into an essentially released, clamping state; wherein the finger grip portion comprises a finger loop which runs from adjacent the tensioning endpieces toward the spring band; ...wherein the finger grip portion has lateral fixing means for interacting with the spring band in a manner holding the finger .grip against movement in an axial direction of the spring band clamp; and wherein said lateral fixing means comprises a projection provided on the finger grip portion; and wherein the spring band has at least one opening into which said projection fits in the installation state.

2. A spring band clamp according to claim 1, wherein the finger grip portion is arranged off center with respect to said at least one of the tensioning endpieces of the spring band in the installation state of spring band clamp.

3. A spring band clamp according to claim 1 wherein the finger grip section portion has an arch which has a contour essentially matched to a finger shape and which extends in a lengthwise direction of the finger grip portion.

4. A spring band clamp according to claim 3, wherein the grip section has a second arch which extends in a widthwise direction of the grip portion.

5. A spring band clamp according to claim 1, wherein the finger grip portion has a width that is at least several times greater than its thickness.

6. A spring band clamp according to claim 5, wherein the width of the finger grip portion is about the same as the width of the spring band.

7. A spring band clamp according to claim 1, wherein the holding element is a separate part from said spring band.

8. A spring band clamp according to claim 1, wherein the holding section comprises a roughly U-shaped clamp for extending over and holding the tensioning endpieces in the installation state; and wherein the clamp has a first fixing arm near the finger grip portion and a second fixing arm disposed away from the finger grip portion.

9. A spring band clamp according to claim 8, wherein the second flying arm has a lower edge which is engageable on the spring band in said installation state.

10. A spring band clamp according to claim 1, wherein the holding element is formed integrally as one-piece with the spring band.

11. A spring band clamp with a spring band having a pair of tensioning endpieces projecting therefrom, and a holding element which holds the tensioning endpieces in a position placing the spring band clamp in a spread, installation state in which the Spring band is subjected to a pretensioning force;. wherein the holding element has a holding section and a disengagement section; wherein the disengagement section of the holding element has a finger grip portion serving as a means for enabling the holding element to be disengaged from said at least one of the tensioning endpieces of the spring band by direct engagement of the finger grip..portion with at least one finger and for thereby enabling the spring band clamp to spring into an essentially released, clamping state wherein the holding element is formed integrally as one-piece with the spring band; wherein the holding element is connected to one of the tensioning endpieces and is bent so as to extend away from in a direction toward the other of the tensioning endpieces; and wherein the holding element has a bent clip portion for engaging behind said other of the tensioning endpieces.

12. A spring band clamp according to claim 11, wherein the clip portion is a punched out portion bent from the holding element at a minor acute angle toward the spring band.

13. A spring band clamp according to claim 11, wherein a predetermined breaking location is provided between the finger grip and said one of the tensioning endpieces.

14. A spring band clamp according to claim 13, wherein the predetermined location has a notch extending across the entire width of connection between the holding element and said one of the tensioning endpieces.

15. A holding element for a spring band clamp with a spring band having a pair of tensioning endpieces projecting therefrom, said holding element comprising a separate part having a holding section in the form of an essentially U-shaped clamp for extending over and holding the tensioning endpieces in an installation state in which the spring band is subjected to a pretensioning force, and a disengagement section having a finger grip portion serving as a means for enabling the holding element to be disengaged from said tensioning endpieces of the spring band by direct engagement of the finger grip portion with at least one finger and for thereby enabling the spring band clamp to spring into an essentially released, clamping state; wherein the clamp has a first fixing arm near the finger grip portion and a second fixing arm disposed away from the finger grip portion; wherein the finger grip portion comprises a finger loop which runs from adjacent the holding section for the tensioning endpieces toward the spring band the installation state; wherein the finger grip portion has lateral fixing means for interacting with the spring band in a manner holding the finger grip...against movement in an axial direction of the spring band clamp in said installation state; wherein said lateral fixing means comprises a projection provided on the finger grip portion which fits into at least one opening in the spring band in the installation state.

* * * * *